US009396758B2

(12) United States Patent
Oz et al.

(10) Patent No.: US 9,396,758 B2
(45) Date of Patent: Jul. 19, 2016

(54) SEMI-AUTOMATIC GENERATION OF MULTIMEDIA CONTENT (71) Applicant: Wochit, Inc., New York, NY (US)

(72) Inventors: Ran Oz, Maccabim (IL); Dror Ginzberg, Nir Zvi (IL); Amotz Hoshen, Tel-Aviv (IL); Eitan Lavi, Tel-Aviv (IL); Igor Dvorkin, Be'er Sheva (IL); Ran Yakir, Hod Hasharon (IL)

(73) Assignee: Wochit, Inc., New York, NY (US)

( * ) Notice: Subject to any disclaimer, the term of this patent is extended or adjusted under 35 U.S.C. 154(b) by 249 days.

(21) Appl. No.: 14/170,621

(22) Filed: Feb. 2, 2014

(65) Prior Publication Data
US 2014/0147095 A1    May 29, 2014

Related U.S. Application Data (63) Continuation-in-part of application No. 13/874,496, filed on May 1, 2013.

(60) Provisional application No. 61/640,748, filed on May 1, 2012, provisional application No. 61/697,833, filed on Sep. 7, 2012.

(51) Int. Cl.
| H04N 5/76 | (2006.01) |
|---|---|
| G11B 27/031 | (2006.01) |
| G06F 17/30 | (2006.01) |
| H04N 9/82 | (2006.01) |
| H04N 5/765 | (2006.01) |
| H04N 5/222 | (2006.01) |

(52) U.S. Cl.
CPC ........ *G11B 27/031* (2013.01); *G06F 17/30823* (2013.01); *H04N 5/76* (2013.01); *H04N 9/8205* (2013.01); *H04N 9/8211* (2013.01); *H04N 5/222* (2013.01); *H04N 5/765* (2013.01)

(58) Field of Classification Search
None
See application file for complete search history.

(56) References Cited

U.S. PATENT DOCUMENTS

| 6,085,201 | A | 7/2000 | Tso | |
|---|---|---|---|---|
| 6,744,968 | B1 | 6/2004 | Imai et al. | |
| 2002/0003547 | A1 | 1/2002 | Wang et al. | |
| 2002/0042794 | A1 | 4/2002 | Konaka | |
| 2004/0111265 | A1 | 6/2004 | Forbes | |
| 2006/0041632 | A1* | 2/2006 | Shah | G06F 17/30038 709/217 |
| 2006/0149558 | A1* | 7/2006 | Kahn | G10L 15/063 704/278 |
| 2006/0212421 | A1 | 9/2006 | Oyarce | |
| 2006/0274828 | A1 | 12/2006 | Siemens et al. | |
| 2006/0277472 | A1 | 12/2006 | Yodo et al. | |
| 2007/0244702 | A1 | 10/2007 | Kahn et al. | |
| 2008/0033983 | A1 | 2/2008 | Ko | |

(Continued)

OTHER PUBLICATIONS

U.S. Appl. No. 13/874,496 Office Action dated Jul. 7, 2015.

(Continued)

*Primary Examiner* — Eileen Adams
(74) *Attorney, Agent, or Firm* — D.Kligler IP Service Ltd.

(57) ABSTRACT

A method for multimedia content generation includes receiving a textual input, and automatically retrieving from one or more media databases a plurality of media items that are relevant to the textual input. User input, which selects one or more of the automatically-retrieved media items and correlates one or more of the selected media items in time with the textual input, is received. A video clip, which includes an audio narration of the textual input and the selected media items scheduled in accordance with the user input, is constructed automatically.

16 Claims, 3 Drawing Sheets

(56) References Cited

U.S. PATENT DOCUMENTS

| | | |
|---|---|---|
| 2008/0104246 A1 | 5/2008 | Katz et al. |
| 2008/0270139 A1 | 10/2008 | Shi |
| 2008/0281783 A1 | 11/2008 | Papkoff et al. |
| 2009/0169168 A1 | 7/2009 | Ishikawa |
| 2010/0153520 A1 | 6/2010 | Daun et al. |
| 2010/0180218 A1 | 7/2010 | Boston et al. |
| 2010/0191682 A1 | 7/2010 | Takamatsu |
| 2011/0109539 A1* | 5/2011 | Wu .................. G06F 3/011 345/156 |
| 2011/0115799 A1 | 5/2011 | Imbruce |
| 2013/0294746 A1 | 11/2013 | Oz et al. |

OTHER PUBLICATIONS

Zisman et at., U.S. Appl. No. 14/214,964 dated Mar. 16, 2014.
U.S. Appl. No. 13/874,496 Office Action dated Jan. 21, 2016.

* cited by examiner

SEMI-AUTOMATIC GENERATION OF MULTIMEDIA CONTENT

CROSS-REFERENCE TO RELATED APPLICATIONS

This application is a continuation in part of U.S. patent application Ser. No. 13/874,496, filed May 1, 2013, which claims the benefit of U.S. Provisional Patent Application 61/640,748, filed May 1, 2012, and U.S. Provisional Patent Application 61/697,833, filed Sep. 7, 2012. The disclosures of all these related applications are incorporated herein by reference.

FIELD OF THE INVENTION

The present invention relates generally to multimedia generation, and particularly to methods and systems for semi-automatic generation of multimedia content.

SUMMARY OF THE INVENTION

An embodiment of the present invention that is described herein provides a method for multimedia content generation. The method includes receiving a textual input, and automatically retrieving from one or more media databases a plurality of media items that are relevant to the textual input. User input, which selects one or more of the automatically-retrieved media items and correlates one or more of the selected media items in time with the textual input, is received. A video clip, which includes an audio narration of the textual input and the selected media items scheduled in accordance with the user input, is constructed automatically.

In some embodiments, retrieving the media items includes automatically deriving one or more search queries from the textual input, and querying the media databases with the search queries. In an embodiment, retrieving the media items includes assigning ranks to the retrieved media items in accordance with relevance to the textual input, filtering the media items based on the ranks, and presenting the filtered media items to a human moderator for producing the user input. In another embodiment, receiving the user input includes receiving from a human moderator an instruction to synchronize a selected media item with a component of the textual input, and automatically constructing the video clip includes synchronizing the selected media item with a narration of the component in the audio narration.

In some embodiments, receiving the textual input includes estimating occurrence times of respective components of the audio narration, and automatically constructing the video clip includes scheduling the selected media items in accordance with the estimated occurrence times. In an example embodiment, estimating the occurrence times is performed before receiving the audio narration. In a disclosed embodiment, receiving the user input is performed before receiving the audio narration.

In another embodiment, automatically constructing the video clip includes defining multiple scheduling permutations of the selected media items, assigning respective scores to the scheduling permutations, and scheduling the selected media items in the video clip in accordance with a scheduling permutation having a best score. In yet another embodiment, automatically constructing the video clip includes dividing a timeline of the video clip into two or more segments, and scheduling the selected media items separately in each of the segments. Dividing the timeline may include scheduling a video media asset whose audio is selected to appear as foreground audio in the video clip, configuring a first segment to end at a start time of the video media asset, and configuring a second segment to begin at an end time of the video media asset. In still another embodiment, automatically constructing the video clip includes training a scheduling model using a supervised learning process, and scheduling the selected media items in accordance with the trained model.

There is additionally provided, in accordance with an embodiment of the present invention, apparatus for multimedia content generation including an interface and a processor. The interface is configured for communicating over a communication network. The processor is configured to receive a textual input, to automatically retrieve, from one or more media databases over the communication network, a plurality of media items that are relevant to the textual input, to receive user input, which selects one or more of the automatically-retrieved media items and correlates one or more of the selected media items in time with the textual input, to receive an audio narration of the textual input, and to automatically construct a video clip, which includes an audio narration of the textual input and the selected media items scheduled in accordance with the user input.

The present invention will be more fully understood from the following detailed description of the embodiments thereof, taken together with the drawings in which:

DETAILED DESCRIPTION OF EMBODIMENTS

Overview

Embodiments of the present invention that are described herein provide improved methods and systems for generating multimedia content. In the disclosed embodiments, a video generation system receives textual input for which a video clip is to be generated. The textual input may comprise, for example, a short article relating to entertainment, business, technology, general news or other topic. The system generates a video clip based on the textual input using a semi-automatic, human-assisted process that is described in detail below.

The video clip generation process is mostly automatic, and reverts to human involvement only where human input has the strongest impact on the quality of the video clip. As a result, the time and cost of generating video clips are reduced to a minimum, while still producing highly professional clips. Moreover, the disclosed techniques generate video clips virtually in real time, shortening the turnaround time needed for presenting breaking news to end users.

In some embodiments, the video generation system analyzes the textual input, for example using contextual analysis algorithms, so as to extract descriptive metadata. The system queries various media databases using the extracted metadata, so as to retrieve media assets that are likely to be related to the textual input. Media assets may comprise, for example, video and audio excerpts, still images, Web-page snapshots, maps, graphs, graphics elements, social network information, and many others. The system ranks and filters the media assets according to their relevance to the textual input, and presents the resulting collection of media assets to a human moderator.

The task of the moderator is largely editorial. The moderator typically selects media assets that will appear in the video clip, and correlates one or more of them in time with the textual input. In some embodiments, the presentation times of at least some media assets are set automatically by the system.

In some embodiments, audio narration of the textual input is not yet available at the moderation stage, and the moderator uses an estimation of the audio timing that is calculated by the system. The system thus receives from the moderator input, which comprises the selected media assets and their correlation with the textual input. Moderation typically requires no more than several minutes per video clip.

Following the moderation stage, the video generation process is again fully-automatic. The system typically receives audio narration of the textual input. (The audio narration is typically produced by a human narrator after the moderation stage, and possibly reviewed for quality by the moderator.) The system generates the video clip using the audio narration and the selected media assets in accordance with the moderator input. The system may include in the video clip additional elements, such as background music and graphical theme. The video clip is then provided as output, optionally following final quality verification by a human.

As noted above, the methods and systems described herein considerably reduce the time and cost of producing video clips. In some embodiments, the disclosed techniques are employed on a massive scale, for converting a large volume of textual articles into video clips using a shared pool of moderators and narrators.

System Description

Figure 1:
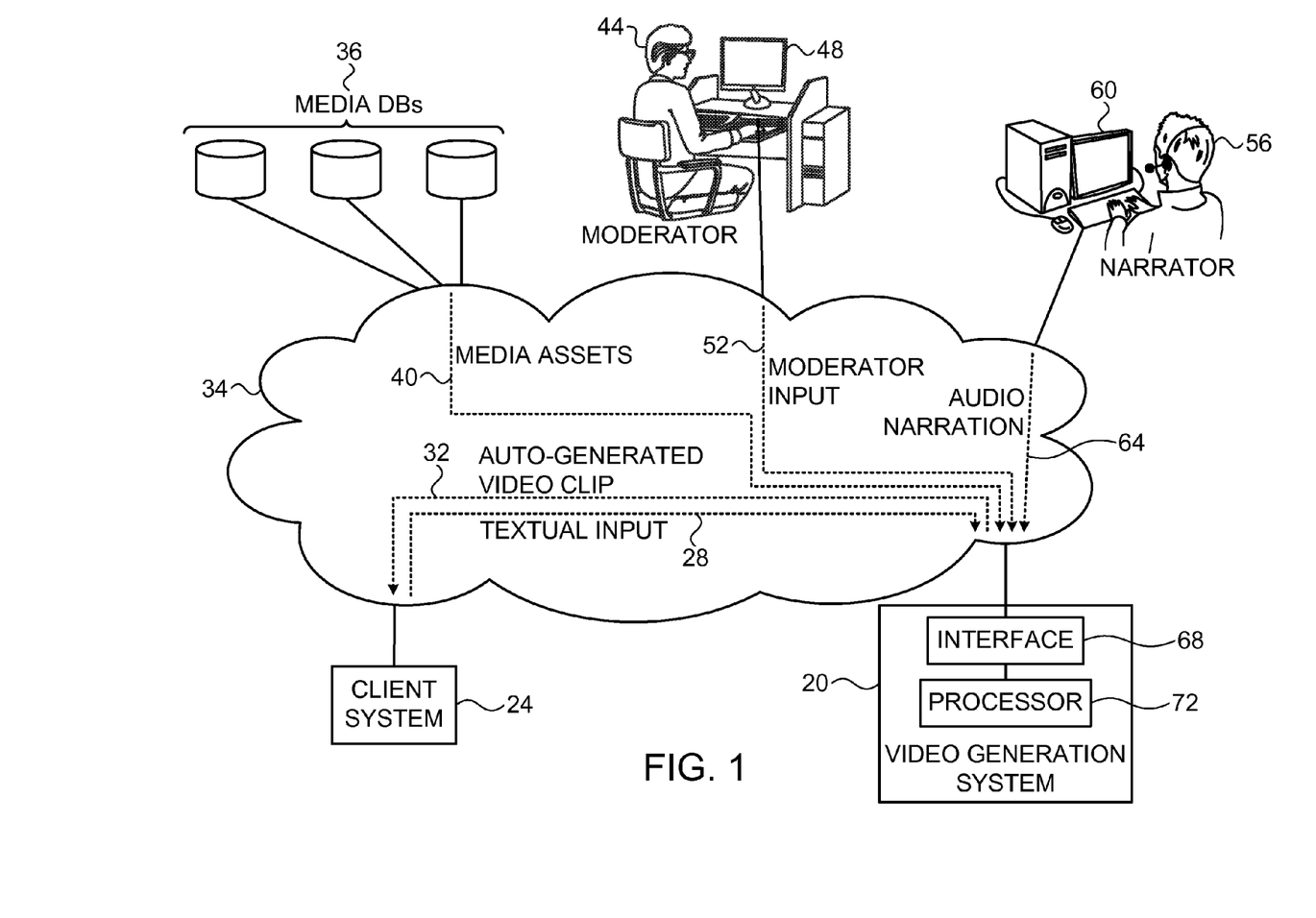
FIG. 1 is a block diagram that schematically illustrates a system for semi-automatic generation of video clips, in accordance with an embodiment of the present invention.

FIG. 1 is a block diagram that schematically illustrates a system 20 for semi-automatic generation of video clips, in accordance with an embodiment of the present invention. System 20 receives textual inputs 28 and generates respective video clips 32 based on the textual inputs. The textual inputs may comprise, for example, articles relating to entertainment, business, technology, general news or any other suitable topics.

In the example of FIG. 1, system 20 receives the textual inputs from a client system 24, and returns the video clips to the client system. A video generation system of this sort may be used, for example, for providing a publisher with video clips based on textual articles received from the publisher. System 20 communicates with client system 24 over a communication network 34, e.g., the Internet. In alternative embodiments, however, system 20 may obtain textual inputs from any other suitable source and deliver video clips to any other suitable destination. System 20 can thus be used in a variety of business models and modes of operation.

The details of the video generation process performed by system 20 will be explained in detail below. Generally, system 20 communicates over network 34 with one or more media databases (DBs) 36 so as to retrieve media assets 40 that are related to the textual input. The media assets are also referred to as media items, and may comprise, for example, video and/or audio excerpts, still images, Web-page snapshots, maps, graphs, graphical elements, social network information, and many others. Media DBs 36 may comprise, for example, content Web sites, social network servers or any other suitable database.

System 20 presents the textual input and the corresponding automatically-retrieved media assets to a human moderator 44 using a moderator terminal 48. The figure shows a single moderator for the sake of clarity. A real-life system, however, will typically use multiple moderators for handling multiple textual inputs and video clips simultaneously. Moderator 48 reviews and selects media assets that will be included in the video clip, and arranges the media assets so as to correlate in time to the timing of the textual input. The moderator thus produces moderator input 52, which is fed back to system 20 over network 34.

In addition to moderator input 52, system 20 further receives audio narration 64 of the textual input in question. The audio narration is produced by a narrator 56 using a narrator terminal 60 and provided to system 20 over network 34. Although the figure shows a single narrator for the sake of clarity, a real-life system will typically use multiple narrators. Based on moderator input 52 and audio narration 64, system 20 automatically produces video clip 32. Video clip 32 is delivered over network 34 to client system 24. In some embodiments, the automatically-generated video clip is verified by moderator 44 before delivery to client system 24. Audio narration 64 is also optionally verified for quality by moderator 44.

In the example of FIG. 1, system 20 comprises an interface 68 for communicating over network 34, and a processor 72 that carries out the methods described herein. The system configuration shown in FIG. 1 is an example configuration, which is chosen purely for the sake of conceptual clarity. In alternative embodiments, any other suitable system configuration can be used.

The elements of system 20 may be implemented using hardware/firmware, such as in an Application-Specific Integrated Circuit (ASIC) or Field-Programmable Gate Array (FPGA), using software, or using a combination of hardware/firmware and software elements. In some embodiments, processor 72 comprises a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Hybrid Semi-Automatic Video Clip Generation

In various industries it is becoming increasingly important to generate video clips with low cost and short turnaround time. For example, news Web sites increasingly prefer to present breaking news and other stories using video rather than text and still images. Brands may wish to post on their Web sites video clips that are relevant to their products. Publishers, such as entertainment Web sites, may wish to publish topic-centered video clips. Multi-Channel Networks (MCNs) may wish to create video clips in a cost-effective way for blog content.

System 20 generates video clips using a unique division of labor between computerized algorithms and human moderation. The vast majority of the process is automatic, and moderator 44 is involved only where absolutely necessary and most valuable. As a result, system 20 is able to produce large volumes of high-quality video clips with low cost and short turnaround time.

Figure 2:
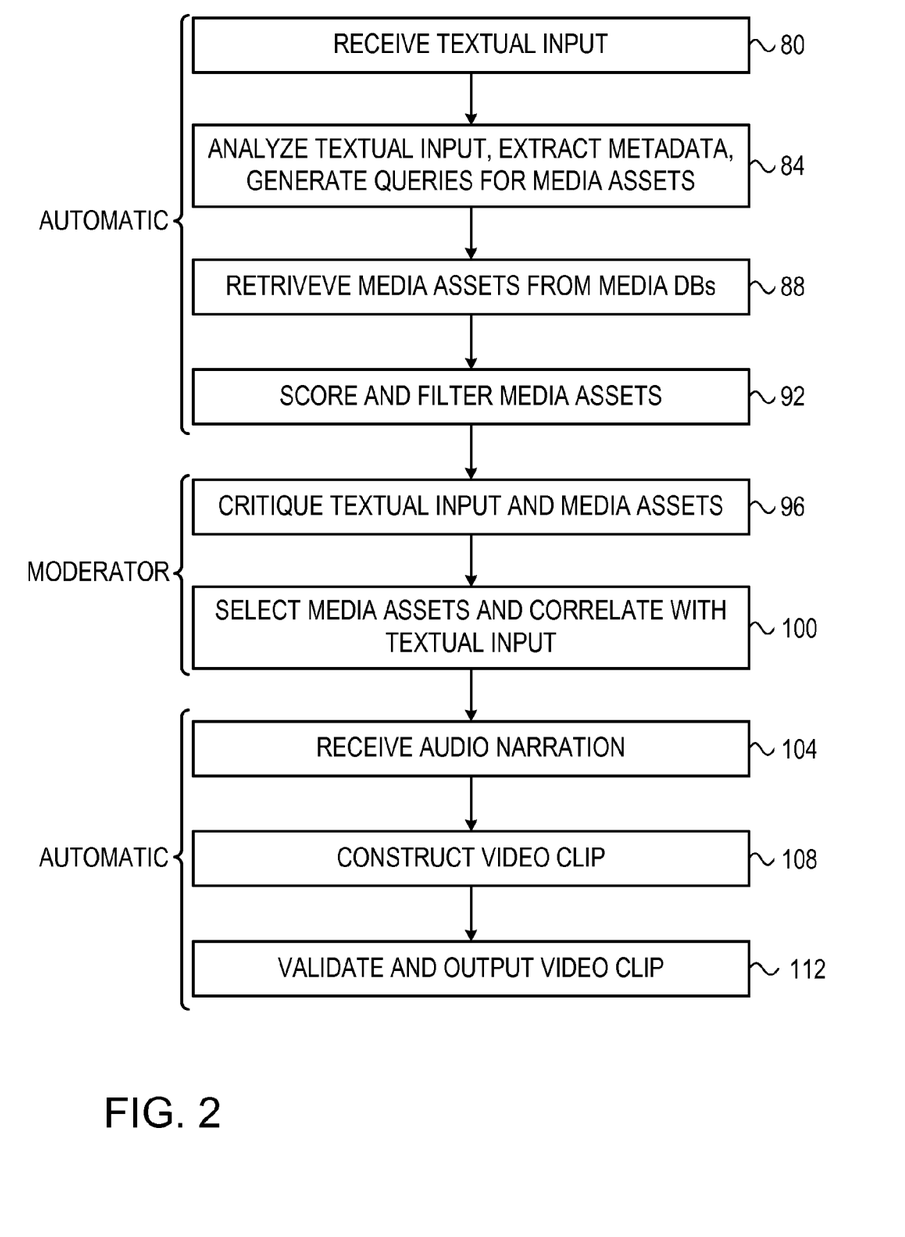
FIG. 2 is a flow chart that schematically illustrates a method for semi-automatic generation of video clips, in accordance with an embodiment of the present invention.

FIG. 2 is a flow chart that schematically illustrates a method for semi-automatic generation of a video clip, in accordance with an embodiment of the present invention. The method begins with processor 72 of system 20 receiving textual input 28 via interface 68, at an input step 80. The textual input, typically a short article, may be provided by client system 24 (as in the example of FIG. 1), obtained by system 20 on its own initiative, or provided to system 20 in any other way.

Processor 72 analyzes the textual input, at an input processing step 84. Typically, processor 72 applies contextual analysis to the textual input so as to extract metadata that is descriptive of the subject matter and content of the article in question. Using the extracted metadata, processor 72 generates one or more search queries for querying media databases 36. In some embodiments, processor 72 summarizes the textual input, e.g., to a certain target length, and then performs contextual analysis and query generation on the summarized article.

At a data retrieval step 88, system 20 queries media databases 36 over network 34 using the automatically-generated search queries, so as to retrieve media assets 40. The media assets may comprise any suitable kind of media items, such as video excerpts, audio excerpts, still images, Web-page snapshots, maps, graphs, graphics elements and social network information.

The retrieved media assets are all likely to be relevant to the textual input, since they were retrieved in response to search queries derived from the textual input. Nevertheless, the level of relevance may vary. Processor 72 assigns relevance scores to the media assets and filters the media assets based on the scores, at a filtering step 92. The filtering operation typically comprises discarding media assets whose score falls below a certain relevance threshold.

When processing video assets, processor 72 may assign relevance scores to specific parts of a video asset, not only to the video asset as a whole. For example, the video asset may be previously tagged by moderators to identify portions of interest, or it may comprise a time-aligned transcript of the video that enables processor 72 to identify portions of interest.

The output of step 92 is a selected collection of ranked media assets, which are considered most relevant to the textual input. System 20 presents this output to moderator 44 over network 34 using terminal 48. At this stage human moderation begins.

In an embodiment, moderator 44 initially critiques the textual input and the selected media assets, at a verification step 96. In an embodiment, the moderator verifies whether the textual input indeed answers the editorial needs of the system. For example, the moderator may verify whether the article content is interesting enough to justify generation of a video clip. The moderator may validate and optionally edit the textual input before it is provided to narrator 56 for narration.

Additionally or alternatively, moderator 44 may proactively search for additional media assets that were not retrieved automatically by system 20, and add such media assets to the collection. The moderator may also validate the article topics that were suggested by the system, and fix them if necessary. In an embodiment, moderator 44 rates the media assets that were suggested by system 20. The rating can be used to train the system, improve its enrichment mechanisms, and enhance the automatic asset retrieval process. Further additionally or alternatively, the moderator may critique and/ or modify the textual input and/or the automatically-selected media assets in any other suitable way.

The moderator selects the media assets that will actually be included in the video clip and correlates them with the textual input, at an asset configuration step 100. Typically, system 20 estimates the expected duration of voice narration of the textual input (even though the actual narration is not available at this stage), and indicates the expected duration to the moderator. This indication helps the moderator determine the number and types of media assets he should select.

If the total duration of the media assets chosen by the moderator is smaller than the expected duration of the narration, system 20 may abort the process altogether, or attempt to find additional media assets (possibly assets that have been filtered-out at step 92).

Moderator 44 may perform additional filtering of the media assets, on top of the filtering performed by processor 72, based on editorial considerations. For example, the moderator may prefer media assets that are likely to be more attractive to the client. Within video assets, the moderator may mark particular segments to be included in the video clip, e.g., specific phrases or sentences from a long speech.

When a video asset comprises an audio soundtrack, the moderator may configure the use of this audio in the video clip. For example, the moderator may decide to use the original audio from the video asset as foreground audio or as background audio in the video clip, or discard the original audio and use only the video content of the video asset.

In an embodiment, the moderator indicates that a specific media asset is to be synchronized with a specific component of the textual input, e.g., with a specific word. This indication will later be used by processor 72 when scheduling the media assets in the final video clip.

Additionally or alternatively, moderator 44 may configure the media assets to be included in the video clip in any other suitable way. The output of the human moderation stage is referred to herein as "moderator input" (denoted 52 in FIG. 1) or "user input" that is fed back to system 20 over network 34.

At a narration input step 104, system 20 receives audio narration 64 of the textual input from narrator 56. The narrator may divide the textual input into segments, and narrate each segment as a separate task. In embodiment of FIG. 2, the audio narration is received after the moderation stage. In alternative embodiments, however, the audio narration may be received and stored in system 20 at any stage, before generation of the final video clip.

In some embodiments, system 20 processes the audio narration in order to improve the audio quality. For example, the system may automatically remove silence periods from the beginning and end of the audio narration, and/or perform audio normalization to set the audio at a desired gain. In some embodiments, moderator 44 reviews the quality of the audio narration. The moderator may approve the narration or request the narration to be repeated, e.g., in case of mistakes, intolerable audio quality such as background noise, wrong pronunciation, or for any other reason.

At this stage, processor 72 automatically constructs the final video clip, at a clip generation step 108. Processor 72 generates the video clip based on the moderator input, the audio narration, and the media assets selected and configured by the moderator. Processor 72 may use a video template, e.g., a template that is associated with the specific client. The final video clip generation stage is elaborated below.

In an embodiment, moderator 44 validates the final video clip, at a final validation step 112. The moderator may discard the video clip altogether, e.g., if the quality of the video clip is inadequate. After validation, the video clip is provided to client system 24. The flow of operations shown in FIG. 2 is depicted purely by way of example. In alternative embodiments, any other suitable flow can be used.

In some embodiments, processor 72 constructs the final video clip by scheduling the selected media assets over a timeline that is correlated with the audio narration. Scheduling of the media assets is performed while considering the constraints given by the moderator (step 100 of FIG. 2) with regard to synchronization of media assets to words or other components of the narrated text.

In some embodiments, processor 72 produces a timing estimate for the narration. The timing estimate gives the estimated occurrence time of each word (or other component) in the audio narration. In some embodiments processor 72 derives the timing estimate from the textual input, independently of the actual audio narration. In many cases, the timing estimate is produced before the audio narration is available. Processor 72 may use any suitable process for producing the timing estimate from the textual input. An example process is detailed in U.S. patent application Ser. No. 13/874,496, cited above. In other embodiments, the audio narration is already available to processor 72 when producing the timing estimate. In these embodiments the processor may derive the timing estimate from the audio narration rather than from the textual input. The output of this estimation process is narrated text with time markers that indicate the timing of each word or other component.

In some embodiments, processor 72 divides the narrated text into segments. The borders of each segment are either the start or end points of the entire narrated text, or the estimated timing of media segments that include foreground audio (e.g., video assets that will be displayed in the final video clip with the original audio and without simultaneous narration). Processor 72 then schedules media assets separately within each segment.

Figure 3:
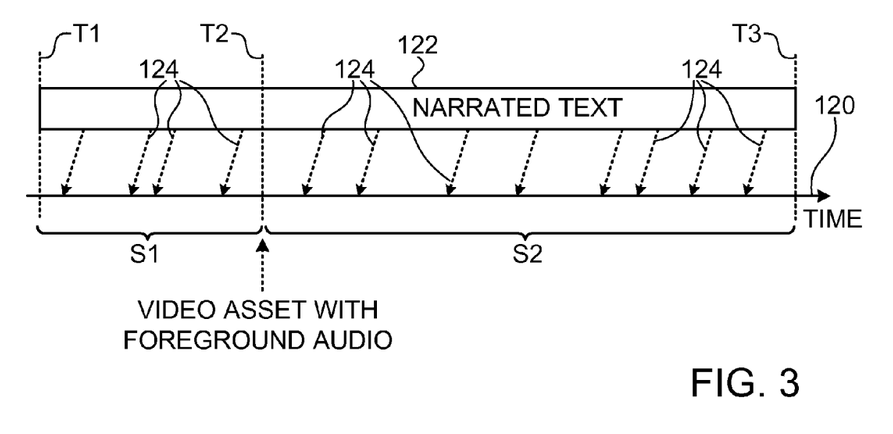
FIG. 3 is a diagram that schematically illustrates a process of automatic timeline generation, in accordance with an embodiment of the present invention.

FIG. 3 is a diagram that schematically illustrates the automatic timeline generation process, in accordance with an embodiment of the present invention. The figure shows a timeline 120 that corresponds to narrated text 122. Multiple markers 124 mark the occurrence times of respective words of the narrated text on the timeline.

In the present example, the moderator instructed that a video asset is to be synchronized to a particular word, and therefore occur at a time T2 on the timeline. (Times T1 and T2 mark the beginning and end of the entire narrated text, respectively.) The moderator has also decided that the original audio track of this video asset will be used as foreground audio in the final video clip. Therefore, there is no narration track to be played during the playing time of this video asset.

In this example, processor 72 divides the narrated text into two segments denoted S1=[T1,T2] and S2=[T2,T3]. The video asset in question is scheduled to appear between the two segments. Within each segment, processor 72 schedules the media assets that will appear in the segment.

Typically, each type of media asset has a minimal and a maximal allowed duration, and therefore not all combinations of media assets can be scheduled in each segment. For example, if the duration of segment S1 is estimated to be four seconds, and the minimal duration of a still-image asset is configured to be two seconds, then no more than two still images can be schedule in this segment.

In some embodiments, processor 72 selects media assets for each segment by calculating multiple possible permutations of media asset scheduling, and assigning each permutation a score. The score of a permutation is typically assigned based on factors such as:

The relevance of a specific media asset to the segment in which it is placed. Processor 72 may assess this relevance, for example, by comparing the contextual metadata of the media asset to the narrated text in the segment.

The success of keeping media assets as close as possible to their desired appearance time as instructed by moderator 44.

The proportion of video media assets vs. still media assets (still images, maps and other still objects).

The proportion of video assets containing original sound.

The overlap between the narrated text and the visual assets (attempting to minimize time in which there is no voice-over in parallel to displaying a visual asset).

The rating that was given by the moderator.

Additionally or alternatively, processor 72 may use any other suitable criteria for calculating the scores of the various scheduling permutations.

For a given segment, processor 72 schedules the media assets in accordance with the permutation having the best score. In some embodiments, processor 72 also schedules video template components, such as visual effects and transitions between successive media assets.

In some embodiments, processor 72 applies a supervised learning algorithm to perform the automatic media asset scheduling (i.e., automatic timeline generation) process. The features for training such a model can be derived from the contextual metadata of the article and the narrated text. The target feature, i.e., examples of correct and/or incorrect placement of a media asset in a given segment, can be derived from feedback of moderator 44. In the training stage the scheduling process is assisted by the moderator. After training, processor 72 can generate the timeline in a fully automatic manner based on the trained model.

In various embodiments, processor 72 may schedule the audio in the video clip in different ways. For example, processor 72 may choose background music for the video clip depending on the contextual sentiment of the textual input, possibly in conjunction with predefined templates. Processor 72 typically receives as input a list of audio tracks: The audio narration of the textual input, the background track or tracks, effects for transition between media assets, raw audio of the media assets (e.g., original audio that is part of a video asset). Processor 72 adds the audio tracks to the timeline, including transitions between the different audio tracks. Transition rules between audio tracks are typically applied based on the applicable template, e.g., by performing cross-fade between different tracks.

Processor 72 typically performs video rendering based on the selected visual assets (e.g., template related visual objects, video assets, still images, maps, Web pages and transitions) and audio assets (e.g., audio narration, background music, effects and natural sounds from video assets) according to the generated time line. Rendering may also be performed automatically using an Application Programming Interface (API) to a suitable rendering module. An optional manual validation step may follow the rendering process.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for multimedia content generation, comprising:
   receiving a textual input;
   before receiving an audio narration of the textual input, estimating occurrence times of respective components of the audio narration;
   automatically retrieving from one or more media databases a plurality of media items that are relevant to the textual input;
   receiving user input, which selects one or more of the automatically-retrieved media items and correlates one or more of the selected media items in time with the textual input; and
   automatically constructing a video clip, which comprises the audio narration and the selected media items scheduled in accordance with the user input, by scheduling the selected media items in accordance with the estimated occurrence times.

2. The method according to claim 1, wherein retrieving the media items comprises automatically deriving one or more search queries from the textual input, and querying the media databases with the search queries.

3. The method according to claim 1, wherein retrieving the media items comprises assigning ranks to the retrieved media items in accordance with relevance to the textual input, filtering the media items based on the ranks, and presenting the filtered media items to a human moderator for producing the user input.

4. The method according to claim 1, wherein receiving the user input comprises receiving from a human moderator an instruction to synchronize a selected media item with a component of the textual input, and wherein automatically constructing the video clip comprises synchronizing the selected media item with a narration of the component in the audio narration.

5. The method according to claim 1, wherein receiving the user input is performed before receiving the audio narration.

6. The method according to claim 1, wherein automatically constructing the video clip comprises defining multiple scheduling permutations of the selected media items, assigning respective scores to the scheduling permutations, and scheduling the selected media items in the video clip in accordance with a scheduling permutation having a best score.

7. A method for multimedia content generation, comprising:
   receiving a textual input;
   automatically retrieving from one or more media databases a plurality of media items that are relevant to the textual input;
   receiving user input, which selects one or more of the automatically-retrieved media items and correlates one or more of the selected media items in time with the textual input; and
   automatically constructing a video clip, which comprises an audio narration of the textual input and the selected media items scheduled in accordance with the user input, including dividing a timeline of the video clip into two or more segments and scheduling the selected media items separately in each of the segments,
   wherein dividing the timeline comprises scheduling a video media asset whose audio is selected to appear as foreground audio in the video clip, configuring a first segment to end at a start time of the video media asset, and configuring a second segment to begin at an end time of the video media asset.

8. The method according to claim 1, wherein automatically constructing the video clip comprises training a scheduling model using a supervised learning process, and scheduling the selected media items in accordance with the trained model.

9. Apparatus for multimedia content generation, comprising:
   an interface for communicating over a communication network; and
   a processor, which is configured to receive a textual input, to estimate, before receiving an audio narration of the textual input, occurrence times of respective components of the audio narration, to automatically retrieve, from one or more media databases over the communication network, a plurality of media items that are relevant to the textual input, to receive user input, which selects one or more of the automatically-retrieved media items and correlates one or more of the selected media items in time with the textual input, to receive an audio narration of the textual input, and to automatically construct a video clip, which comprises the audio narration and the selected media items scheduled in accordance with the user input, by scheduling the selected media items in accordance with the estimated occurrence times.

10. The apparatus according to claim 9, wherein the processor is configured to automatically derive one or more search queries from the textual input, and to retrieve the media items by querying the media databases with the search queries.

11. The apparatus according to claim 9, wherein the processor is configured to assign ranks to the retrieved media items in accordance with relevance to the textual input, to filter the media items based on the ranks, and to present the filtered media items to a human moderator for producing the user input.

12. The apparatus according to claim 9, wherein the processor is configured to receive from a human moderator an instruction to synchronize a selected media item with a component of the textual input, and to automatically construct the video clip by synchronizing the selected media item with a narration of the component in the audio narration.

13. The apparatus according to claim 9, wherein the processor is configured to receive the user input before receiving the audio narration.

14. The apparatus according to claim 9, wherein the processor is configured to define multiple scheduling permutations of the selected media items, to assign respective scores to the scheduling permutations, and to schedule the selected media items in the video clip in accordance with a scheduling permutation having a best score.

15. The apparatus according to claim 9, wherein the processor is configured to train a scheduling model using a supervised learning process, and to schedule the selected media items in accordance with the trained model.

16. Apparatus for multimedia content generation, comprising:
   an interface for communicating over a communication network; and
   a processor, which is configured to receive a textual input, to automatically retrieve, from one or more media databases over the communication network, a plurality of media items that are relevant to the textual input, to receive user input, which selects one or more of the automatically-retrieved media items and correlates one or more of the selected media items in time with the textual input, to receive an audio narration of the textual input, and to automatically construct a video clip, which comprises an audio narration of the textual input and the selected media items scheduled in accordance with the user input, including dividing a timeline of the video clip into two or more segments and scheduling the selected media items separately in each of the segments, wherein the processor is configured to schedule a video media asset whose audio is selected to appear as foreground audio in the video clip, to configure a first segment to end at a start time of the video media asset, and to configure a second segment to begin at an end time of the video media asset.

* * * * *